(12) United States Patent
Dusanapudi et al.

(10) Patent No.: US 10,713,179 B2
(45) Date of Patent: *Jul. 14, 2020

(54) EFFICIENTLY GENERATING EFFECTIVE ADDRESS TRANSLATIONS FOR MEMORY MANAGEMENT TEST CASES

(71) Applicant: International Business Machines Corporation, Armonk, NY (US)

(72) Inventors: Manoj Dusanapudi, Bangalore (IN); Shakti Kapoor, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/373,372

(22) Filed: Apr. 2, 2019

(65) Prior Publication Data

US 2019/0227945 A1    Jul. 25, 2019

Related U.S. Application Data

(63) Continuation of application No. 15/226,974, filed on Aug. 3, 2016, now Pat. No. 10,346,314.

(51) Int. Cl.
  *G06F 12/00* (2006.01)
  *G06F 12/1018* (2016.01)

(52) U.S. Cl.
  CPC .. *G06F 12/1018* (2013.01); *G06F 2212/1016* (2013.01); *G06F 2212/1056* (2013.01); *G06F 2212/152* (2013.01); *G06F 2212/651* (2013.01); *G06F 2212/657* (2013.01)

(58) Field of Classification Search
  CPC ......... G06F 12/1018; G06F 2212/1016; G06F 2212/1056; G06F 2212/152; G06F 2212/651; G06F 2212/657
  See application file for complete search history.

(56) References Cited

U.S. PATENT DOCUMENTS

| | | |
|---|---|---|
| 6,438,671 B1 | 8/2002 | Doing et al. |
| 7,330,958 B2 | 2/2008 | Davis |
| 7,734,926 B2 | 6/2010 | Morais |
| 7,797,650 B2 | 9/2010 | Bag et al. |

(Continued)

OTHER PUBLICATIONS

International Business Machines Corporation, "Book III-S: Power ISA Operating Environment Architecture—Server Environment [Category: Server]", Chapters 5-last, Power ISA™ Version 2.06 Revision B, Jul. 23, 2010, pp. 765-1313, IBM (online, "power.org"), URL: https://www.power.org/wp-content/uploads/2012/07/PowerISA_V2.06B_V2_PUBLIC.pdf.

(Continued)

*Primary Examiner* — Kalpit Parikh
(74) *Attorney, Agent, or Firm* — Jason H. Sosa

(57) ABSTRACT

Efficiently generating effective address translations for memory management test cases including obtaining a first set of EAs, wherein each EA comprises an effective segment ID and a page, wherein each effective segment ID of each EA in the first set of EAs is mapped to a same first effective segment; obtaining a set of virtual address corresponding to the first set of EAs; translating the first set of EAs by applying a hash function to each virtual address in the set of virtual addresses to obtain a first set of PTEG addresses mapped to a first set of PTEGs; and generating a translation for a second set of EAs to obtain a second set of PTEG addresses mapped to the first set of PTEGs.

20 Claims, 6 Drawing Sheets

(56) References Cited

U.S. PATENT DOCUMENTS

| | | |
|---|---|---|
| 7,984,263 B2 | 7/2011 | Sathaye et al. |
| 8,041,923 B2 | 10/2011 | Greiner et al. |
| 2013/0339651 A1 | 12/2013 | Bybell et al. |
| 2013/0339652 A1 | 12/2013 | Bybell et al. |
| 2015/0277879 A1 | 10/2015 | Gschwind et al. |
| 2018/0039579 A1 | 2/2018 | Dusanapudi et al. |

OTHER PUBLICATIONS

Appendix P; List of IBM Patent or Applications Treated as Related, Apr. 1, 2019, 2 pages.

EFFICIENTLY GENERATING EFFECTIVE ADDRESS TRANSLATIONS FOR MEMORY MANAGEMENT TEST CASES

CROSS-REFERENCE TO RELATED APPLICATION

This application is a continuation application of and claims priority from U.S. patent application Ser. No. 15/226,974, filed Aug. 3, 2016.

BACKGROUND

Field of the Invention

The field of the invention is data processing, or, more specifically, methods, apparatus, and products for efficiently generating effective address translations for memory management test cases.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

SUMMARY

Methods, systems, and apparatus for efficiently generating effective address translations for memory management test cases are disclosed in this specification. Efficiently generating effective address translations for memory management test cases includes obtaining a first set of effective addresses (EAs), wherein each EA comprises an effective segment ID and a page, wherein each effective segment ID of each EA in the first set of EAs is mapped to a same first effective segment; obtaining a set of virtual address corresponding to the first set of EAs, wherein each virtual segment ID of each virtual address in the first set of virtual addresses is mapped to a same virtual segment; translating the first set of EAs by applying a hash function to each virtual address in the set of virtual addresses to obtain a first set of page table entry group (PTEG) addresses mapped to a first set of PTEGs; and generating a translation for a second set of EAs to obtain a second set of PTEG addresses mapped to the first set of PTEGs, wherein each effective segment ID of each EA in the second set of EAs is mapped to a same second effective segment.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
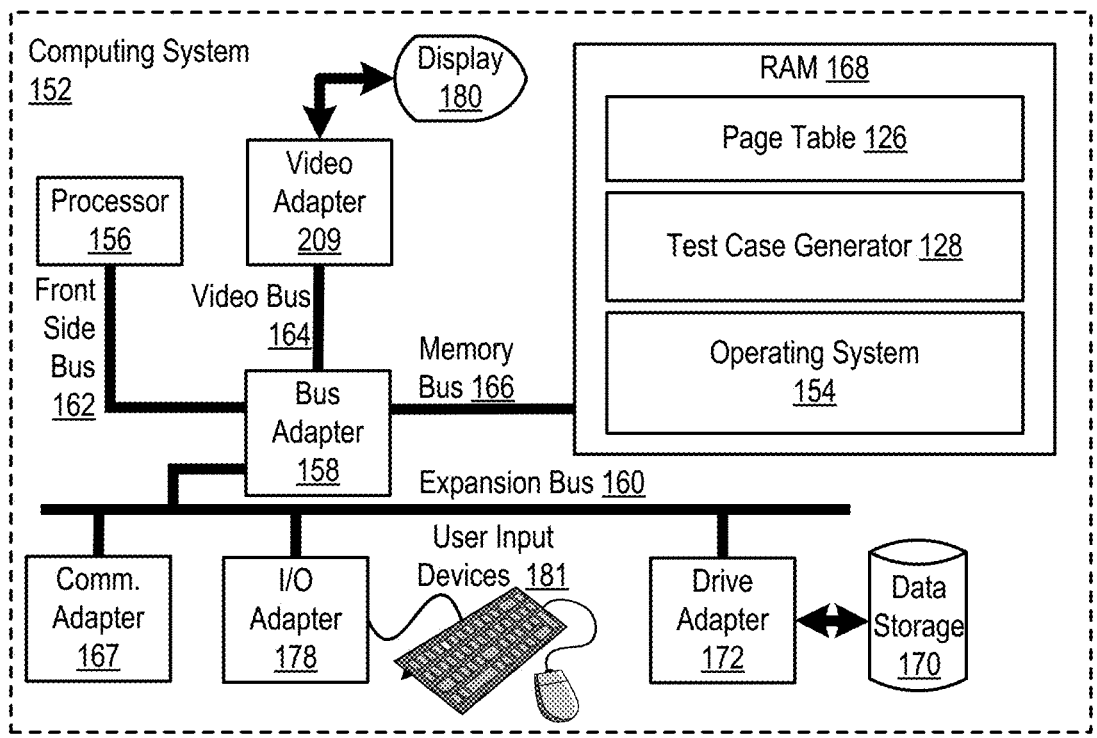
FIG. 1 sets forth a block diagram of an example system configured for efficiently generating effective address translations for memory management test cases according to embodiments of the present invention.

Exemplary methods, apparatus, and products for efficiently generating effective address translations for memory management test cases in accordance with the present invention are described with reference to the accompanying drawings, beginning with FIG. 1. FIG. 1 sets forth a block diagram of automated computing machinery comprising an exemplary computing system (152) configured for efficiently generating effective address translations for memory management test cases according to embodiments of the present invention. The computing system (152) of FIG. 1 includes at least one computer processor (156) or 'CPU' as well as random access memory (168) ('RAM') which is connected through a high speed memory bus (166) and bus adapter (158) to processor (156) and to other components of the computing system (152).

Stored in RAM (168) is a page table (126) and a test case generator (128), a module of computer program instructions for efficiently generating effective address translations for memory management test cases. Also stored in RAM (168) is an operating system (154). Operating systems useful in computers configured for efficiently generating effective address translations for memory management test cases according to embodiments of the present invention include UNIX, Linux™, Microsoft XP™, AIX™, IBM's i5/OS™, and others as will occur to those of skill in the art. The operating system (154) in the example of FIG. 1 is shown in RAM (168), but many components of such software typically are stored in non-volatile memory also, such as, for example, on a disk drive (170).

The computing system (152) of FIG. 1 includes disk drive adapter (172) coupled through expansion bus (160) and bus adapter (158) to processor (156) and other components of the computing system (152). Disk drive adapter (172) connects non-volatile data storage to the computing system (152) in the form of disk drive (170). Disk drive adapters useful in computers configured for efficiently generating effective address translations for memory management test cases according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computing system (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computing system (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computing system (152) of FIG. 1 includes a communications adapter (167) for data communications with other computers (182) and for data communications with a data communications network. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for efficiently generating effective address translations for memory management test cases according to embodiments of the present invention include modems for wired dial-up communications, Ethernet (IEEE 802.3) adapters for wired data communications, and 802.11 adapters for wireless data communications.

Figure 2:
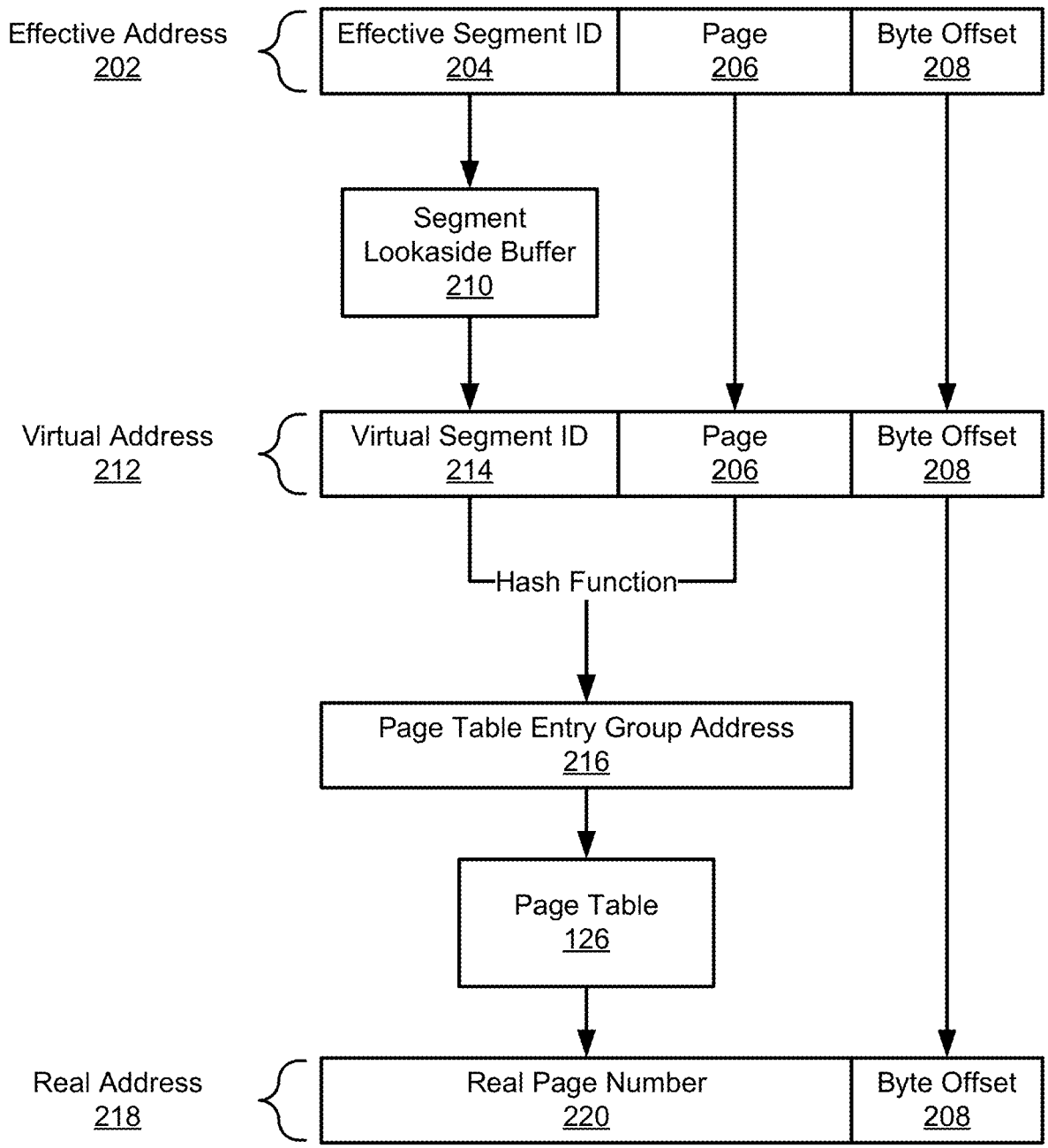
FIG. 2 sets forth a block diagram of address translation according to embodiments of the present invention.

FIG. 2 is an example diagram illustrating address translation in a computing system configured for efficiently generating effective address translations for memory management test cases. FIG. 2 includes an effective address (EA) (202) that includes an effective segment ID (ESID) (204), a page (206), and a byte offset (208), a segment lookaside buffer (SLB) (210), a virtual address (212) that includes a virtual segment ID (VSID) (214), the page (206), and the byte offset (208), a page table entry group (PTEG) address (216), a page table (126), and a real address (218) that includes a real page number (220) and the byte offset (208).

An exemplary address translation in FIG. 2 may start when a request for data within memory is made. A program may first reference memory using the effective address (202) computed by a processor when it executes a load, store, branch or cache instruction, etc. Each process may include its own unique effective address space. This allows every process to run as though it is the only process running on the system and has all required memory resources available. Each effective address (202) may be, for example, 64 bits.

In order to translate the effective address (202) to the virtual address (212), the operating system or other component may perform a table lookup within the SLB (210) and, if needed, a segment table (not shown). The SLB (210) may be stored in hardware memory (i.e., not in volatile memory, such as RAM) within the CPU. The SLB (210) may include at least two fields—an ESID field and VSID field.

Accordingly, the operating system or other components may translate the effective address (202) to the virtual address (212) by first searching within the SLB for the ESID (204). If the particular ESID (204) is within the SLB (210) (a hit), then the ESID (204) indicates the mapped or corresponding VSID (214). If the ESID (204) is not within the SLB (210) (a miss), then the operating system or other component may search the segment table for the ESID (204). If the ESID (204) is within the segment table (a hit), then the ESID (204) indicates the mapped VSID (214). If the ESID (204) is not within the SLB (210) or segment table (a miss), the ESID (204) in some cases may be paged into memory from a storage device (e.g., disk) and the segment table (and SLB) may accordingly be updated.

If the ESID (204) is found within the SLB (210) or segment table, then the virtual address (212) may be obtained. A virtual address may be an intermediate address that is generated by the processor or processor core (or hypervisor) during the address translation process. The virtual address (212) includes the VSID (214) and the same page (206) and byte offset (208) of the effective address (202) (i.e., the page (206) and byte offset (208) are unaltered from the effective address (202) to the virtual address (212)). The VSID (214) and the page (206) together form the virtual page number (VPN).

The VPN (the VSID (214) and the page (206)) is then used to retrieve and generate the real address (218). The mapping between the VPN and real page number (220) is stored in a page table entry (PTE) within the page table (126). A translation lookaside buffer (TLB) (not shown) may be utilized to store and retrieve recently accessed page table entries (PTEs). If the TLB does not have an entry for the VPN, or if the TLB is otherwise uncreated or unavailable, the PTE is retrieved using a hash function applied to the VPN.

The hashing function takes as inputs the VSID (214), the page (206), and other values that indicate the location in memory of the page table (126). The result of the hashing function is a page table entry group (PTEG) address that is an entry point to the page table (126), within which a search is performed for a matching PTE. As part of the hashing function, a portion (e.g., 11 bits) of the VSID (214) is hashed with a portion (e.g., 11 bits) of the page (206). This part of the hash function generates a portion (e.g., 11 bits) of the PTEG address that points to a PTEG within the page table (126).

Once a matching PTE is found within the PTEG identified by the PTEG address, the real page number (220) is extracted from the PTE and used to generate the real address (218). A real address (218) may be a final address that is generated by the processor or processor core (or hypervisor) during the address translation process. After the real address (218) is obtained, it may be transmitted to a memory subsystem and may be utilized to access memory and devices (e.g., Peripheral Component Interconnect Express (PCIE) devices). A real address (218) may correspond to some physical resource in the system, such as an address in a cache or RAM.

Performing the hashing function on a VPN is an expensive process (in terms of cycles). The large number of address translations required for generating test cases may therefore require a large amount of time and cycles to produce. A "test case" as described herein may refer to a set of variables or conditions under which a tester (e.g., an operating system, a user, program module, etc.) may determine whether a system under the test satisfies requirements or works correctly. Test cases may include such information as preconditions, a set of input values, a set of expected results, how to execute and check results, and/or expected post conditions, or any other suitable information. Test cases may also include an EA or a set of EAs and the associated translations into PTEG addresses.

Figure 3:
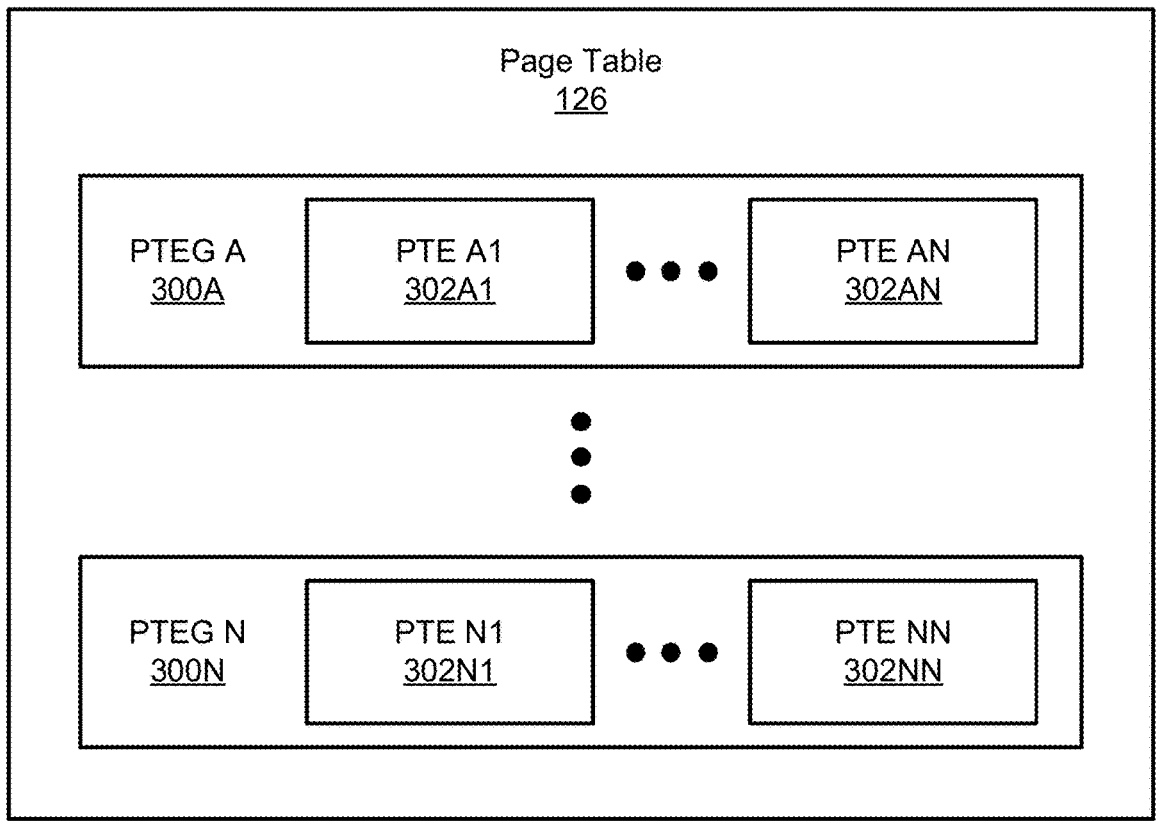
FIG. 3 sets forth a block diagram of a page table according to embodiments of the present invention.

For further explanation, FIG. 3 sets forth an example diagram illustrating a page table configured for efficiently generating effective address translations for memory management test cases. The page table (126) includes a number of page table entry groups (PTEGs) (PTEG A (300A), PTEG N (300N)). Each PTEG (PTEG A (300A), PTEG N (300N)) includes a number of page table entries (PTEs) (PTE A1 (302A1), PTEG AN (302AN), PTE N1 (302N1), PTEG NN (302NN)).

Each PTEG (PTEG A (300A), PTEG N (300N)) may be identified by a PTEG address, a portion of which may identify the PTEG within the page table (126). The PTEG address may include other information, such as the location within memory of the page table (126). The PTE within a PTEG may be identified using a portion of the PTEG address or, alternatively, the PTE may be identified using a portion of the virtual address. Once the PTEG is identified, a portion of each PTE is compared to a portion of the PTEG address or virtual address to find a match. The matching PTE contains the real page number for the virtual address translation.

For testing purposes, the page table (126) may be set up using virtual to real address aliasing. Virtual to real address aliasing may populate each PTE within a given PTEG with the same real page number. In such a system, each EA that is translated into a PTE within a given PTEG is mapped to the same real page number as the other EAs that translate into the other PTEs within the same PTEG.

Figure 4:
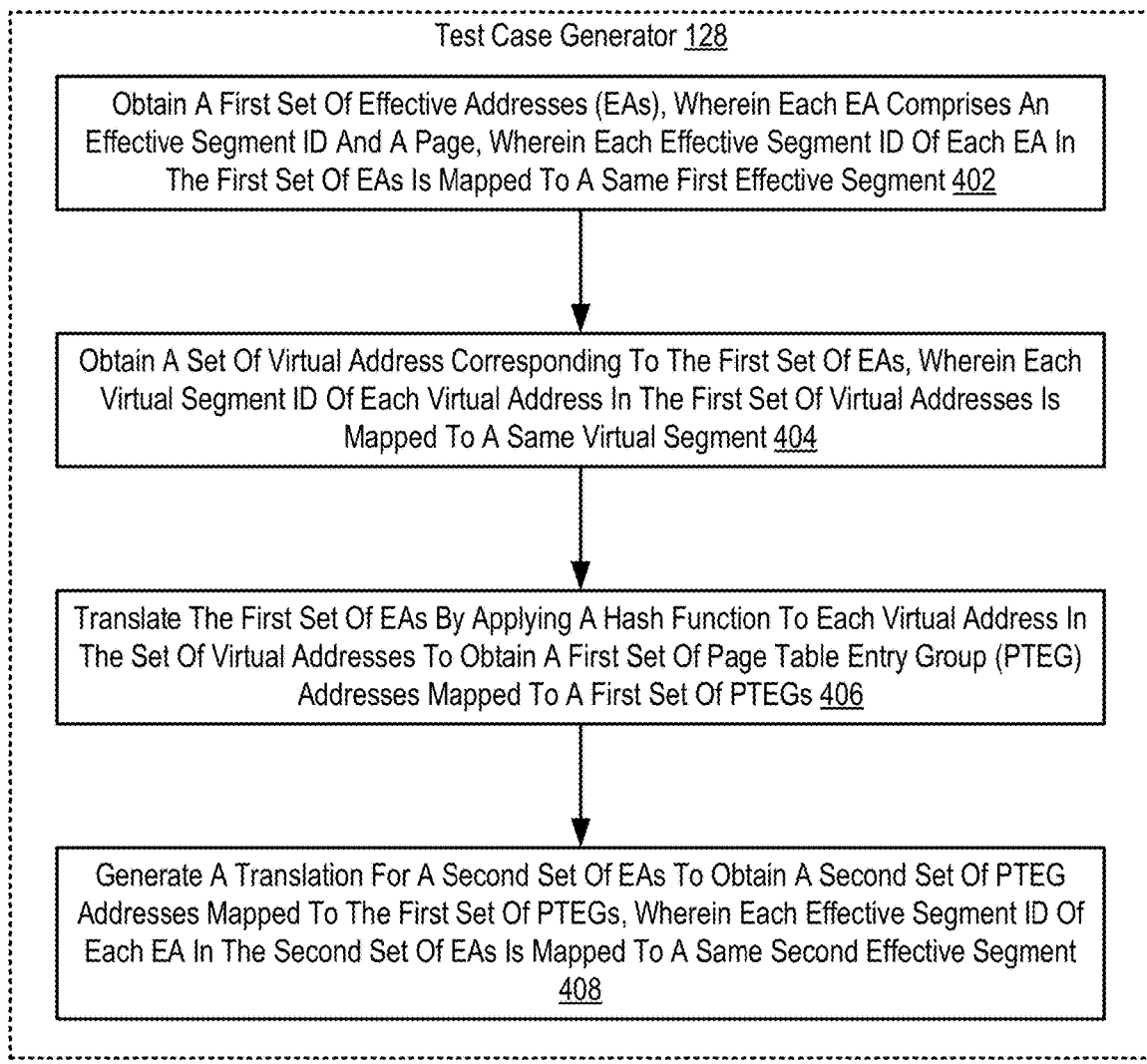
FIG. 4 sets forth a flow chart illustrating an exemplary method for efficiently generating effective address translations for memory management test cases according to embodiments of the present invention.

For further explanation, FIG. 4 sets forth a flow chart illustrating an exemplary method for efficiently generating effective address translations for memory management test cases. The method of FIG. 4 includes obtaining (402) a first set of effective addresses (EAs), wherein each EA comprises an effective segment ID and a page, wherein each effective segment ID of each EA in the first set of EAs is mapped to a same first effective segment. Obtaining (402) a first set of effective addresses (EAs), wherein each EA comprises an effective segment ID and a page, wherein each effective segment ID of each EA in the first set of EAs is mapped to a same first effective segment may include generating the first set of EAs using a ESID that is consistent across the set of EAs. Each page for the set of EAs may be different, and may be numerically consecutive values. Each EA in the first set of EAs, therefore, may address a different page within the EA segment.

For example, an EA may be 64 bits in length and have a 36 bit ESID and 16 bit page. The set of EAs may be generated each having identical 36 bit ESIDs, and each with different 16 bit pages. The 16 bit pages may be numerically consecutive values. An example set of EAs may include 128 EAs in order to target an initial set of 128 PTEs and 128 pages.

The method of FIG. 4 also includes obtaining (404) a set of virtual address corresponding to the first set of EAs, wherein each virtual segment ID of each virtual address in the first set of virtual addresses is mapped to a same virtual segment. Obtaining (404) a set of virtual address corresponding to the first set of EAs, wherein each virtual segment ID of each virtual address in the first set of virtual addresses is mapped to a same virtual segment may include using an SLB to obtain or otherwise retrieve a corresponding VSID for the ESID of the set of EAs. The SLB may be searched using the ESID as a key and accessing an SLB entry corresponding to the ESID. The VSID from the SLB entry corresponding to the ESID may be read and used to generate a virtual address. Because the EAs in the first set of EAs each have the same ESID, each EA in the first set of EAs will translate to a set of virtual address each with the same VSID. Therefore, the SLB may only be accessed once in order to generate each virtual address in the set of virtual addresses.

For example, a virtual address may be 78 bits in length and have a 50 bit VSID and a 16 bit page. Each virtual address in the set of virtual addresses may be generated having identical 50 bit VSIDs, and each with different 16 bit pages. The 16 bit pages of each virtual address is the same 16 bit pages included in the corresponding EA.

The method of FIG. 4 also includes translating (406) the first set of EAs by applying a hash function to each virtual address in the set of virtual addresses to obtain a first set of page table entry group (PTEG) addresses mapped to a first set of PTEGs. Translating (406) the first set of EAs by applying a hash function to each virtual address in the set of virtual addresses to obtain a first set of page table entry group (PTEG) addresses mapped to a first set of PTEGs may include using, as inputs to the hashing function, the VSID (or a portion of the VSID) and the page (or a portion of the page) of the virtual address. The result of the hashing function is a PTEG address that is an entry point to the page table. Each PTEG address resulting from the set of virtual addresses will be unique among the set of virtual addresses (i.e., the set of virtual addresses will be translated into an equal number of unique PTEG addresses). The resulting PTEG addresses may also identify (i.e., be mapped to) a consecutive set of PTEGs. Each virtual address in the set of virtual addresses is hashed individually requiring a number of cycles each time the hashing function is applied.

For example, the PTEG address may be generated using 11 bits from the VSID and 11 bits from the page. An XOR operation may be applied to the two sets of 11 bits, resulting in an 11 bit key that uniquely identifies one PTEG from a group of up to 2048 PTEGs. If the first set of EAs includes 128 EAs, the set of virtual addresses will include 128 virtual addresses, and the virtual addresses are translated into 128 unique (consecutive) PTEG addresses that identify (e.g., are mapped to) 128 PTEs.

The method of FIG. 4 also includes generating (408) a translation for a second set of EAs to obtain a second set of PTEG addresses mapped to the first set of PTEGs, wherein each effective segment ID of each EA in the second set of EAs is mapped to a same second effective segment. Generating (408) a translation for a second set of EAs to obtain a second set of PTEG addresses mapped to the first set of PTEGs, wherein each effective segment ID of each EA in the second set of EAs is mapped to a same second effective segment may include generating the translation algorithmically without applying a hash function. Therefore, the PTEG address translation from the second set of EAs is accomplished more efficiently than the PTEG address translation from the first set of EAs.

Generating the translations algorithmically may include performing a set of instructions that quickly generate a PTEG address from an EA without applying a hash function, such as the hash function applied to each virtual address translated from the first set of EAs. Generating the translations algorithmically may include generating a PTEG address and assigning the PTEG address as the translation of a EA.

Each EA from the first set of EAs may share one or more portions of the address with a corresponding EA from the second set of EAs. For example, the pages from the first set of EAs may be pages "0000000000000000" through "0000000001111111" and the pages from the second set of EAs may also be pages "0000000000000000" through "0000000001111111". Generating the translations algorithmically may include determining that one of the EAs in the first set of EAs has a same or similar portion (such as the page) to an EA in the second set of EAs; and generating a PTEG address translation using the PTEG address of the EA in the first set of EAs having the matching portion. The newly generated PTEG address may be mapped to the same PTEG as the PTEG address calculated using the hash function. The newly generated PTEG address may be identical or substantially similar to the PTEG address calculated using the hash function. Alternatively, certain bits may be modified from the PTEG address calculated using the hash function to generate the PTEG address for the EA from the second set of EAs.

Once a PTEG address is generated for each EA in the second set of EAs, each of the first set of EAs may be mapped to a first PTE in each of the PTEGs, and each of the second set of EAs may be mapped to a second PTE in each of the PTEGs. The first set of EAs may be mapped to the same set of PTEGs as the second set of EAs, and each PTEG may have one PTE for an EA in the first set of EAs and one PTE for an EA in the second set of EAs.

Translations may be generated without using the hashing function for additional sets of EAs in order to generate a number of sets of EAs with translations to a consecutive set of PTEGs, each with a number of PTEs equal to the number of sets of EAs. For example, a first set of EAs may be translated using the hashing function to get a set of (consecutive) PTEG addresses that map to PTEs within a set of (consecutive) PTEGs within the page table. Translations for a second set of EAs may be generated without using the hashing function as described above to get a set of (consecutive) PTEG addresses that map to another PTE within the set of (consecutive) PTEGs within the page table. If the page table is generated with, for example, eight PTEs in each PTEG, then the process may be performed once using the hashing function, and seven additional times using the translation generation process (and without using the hashing function).

For example, assume a test case requires translations that target each of eight PTEs in each PTEG of a group of 128 consecutive PTEGs. A first set of 128 EAs, each with the same ESID, may be translated using the hashing function into 128 PTEG addresses. The 128 PTEG addresses may be used as the basis to generate translations, without using the hashing function, for seven other sets of EAs, with each set of EAs having the same ESID. This process is more efficient than applying the hashing function to each of the 1,024 EAs in the eight sets of EAs.

Figure 5:
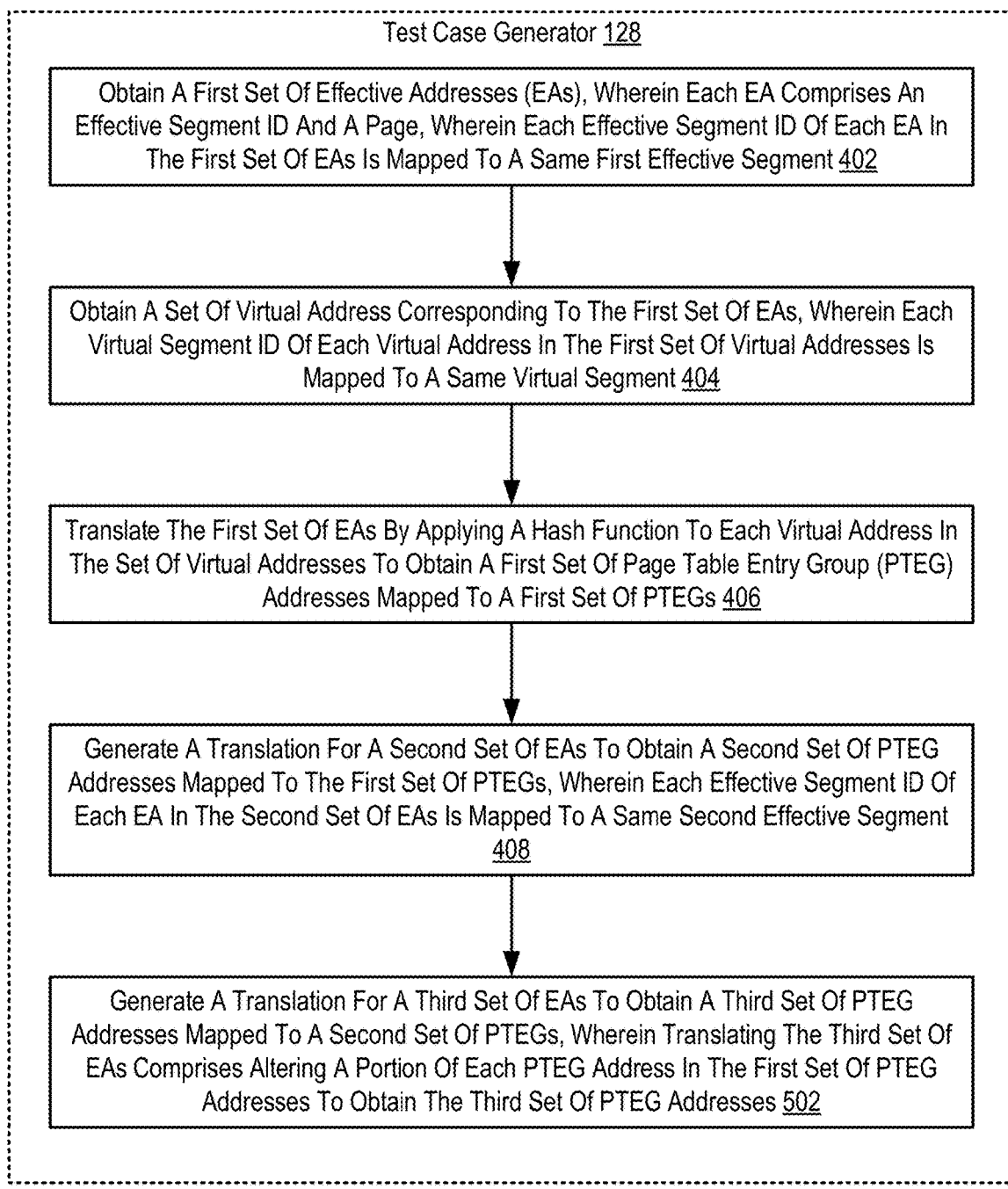
FIG. 5 sets forth a flow chart illustrating an exemplary method for efficiently generating effective address translations for memory management test cases according to embodiments of the present invention.

For further explanation, FIG. 5 sets forth a flow chart illustrating an exemplary method for efficiently generating effective address translations for memory management test cases according to embodiments of the present invention that includes obtaining (402) a first set of effective addresses (EAs), wherein each EA comprises an effective segment ID and a page, wherein each effective segment ID of each EA in the first set of EAs is mapped to a same first effective segment; obtaining (404) a set of virtual address corresponding to the first set of EAs, wherein each virtual segment ID of each virtual address in the first set of virtual addresses is mapped to a same virtual segment; translating (406) the first set of EAs by applying a hash function to each virtual address in the set of virtual addresses to obtain a first set of page table entry group (PTEG) addresses mapped to a first set of PTEGs; and generating (408) a translation for a second set of EAs to obtain a second set of PTEG addresses mapped to the first set of PTEGs, wherein each effective segment ID of each EA in the second set of EAs is mapped to a same second effective segment.

The method of FIG. 5 differs from the method of FIG. 4, however, in that the method of FIG. 5 further includes generating (502) a translation for a third set of EAs to obtain a third set of PTEG addresses mapped to a second set of PTEGs, wherein translating the third set of EAs comprises altering a portion of each PTEG address in the first set of PTEG addresses to obtain the third set of PTEG addresses. Generating (502) a translation for a third set of EAs to obtain a third set of PTEG addresses mapped to a second set of PTEGs, wherein translating the third set of EAs comprises altering a portion of each PTEG address in the first set of PTEG addresses to obtain the third set of PTEG addresses may include generating a set of EAs, each with the same ESID, and generating PTEG address translations for the EAs algorithmically and without applying a hashing function. Generating the PTEG address translations may include generating a set of PTEG addresses by altering higher order elements (i.e., bits) of the PTEG addresses translated from the first set of EAs. By altering higher order elements of the PTEG address, the PTEG address are mapped to a different (consecutive) set of PTEGs within the page table.

For example, assume that a first set of 128 EAs are translated into a set of 128 PTEG addresses that include 11 bit keys into the page table that range from "00010000000" through "00011111111". Another set of 128 PTEG addresses targeting a different group of 128 PTEGs may be generated for another set of 128 EAs by altering higher order bits of the 11 bit keys of the first set of PTEG addresses, such as "00100000000" through "00101111111".

Once the third set of EAs is (algorithmically) translated into a set of PTEG addresses, additional translations for EAs may be generated using the steps described above in reference to step 408 in FIG. 4.

Figure 6:
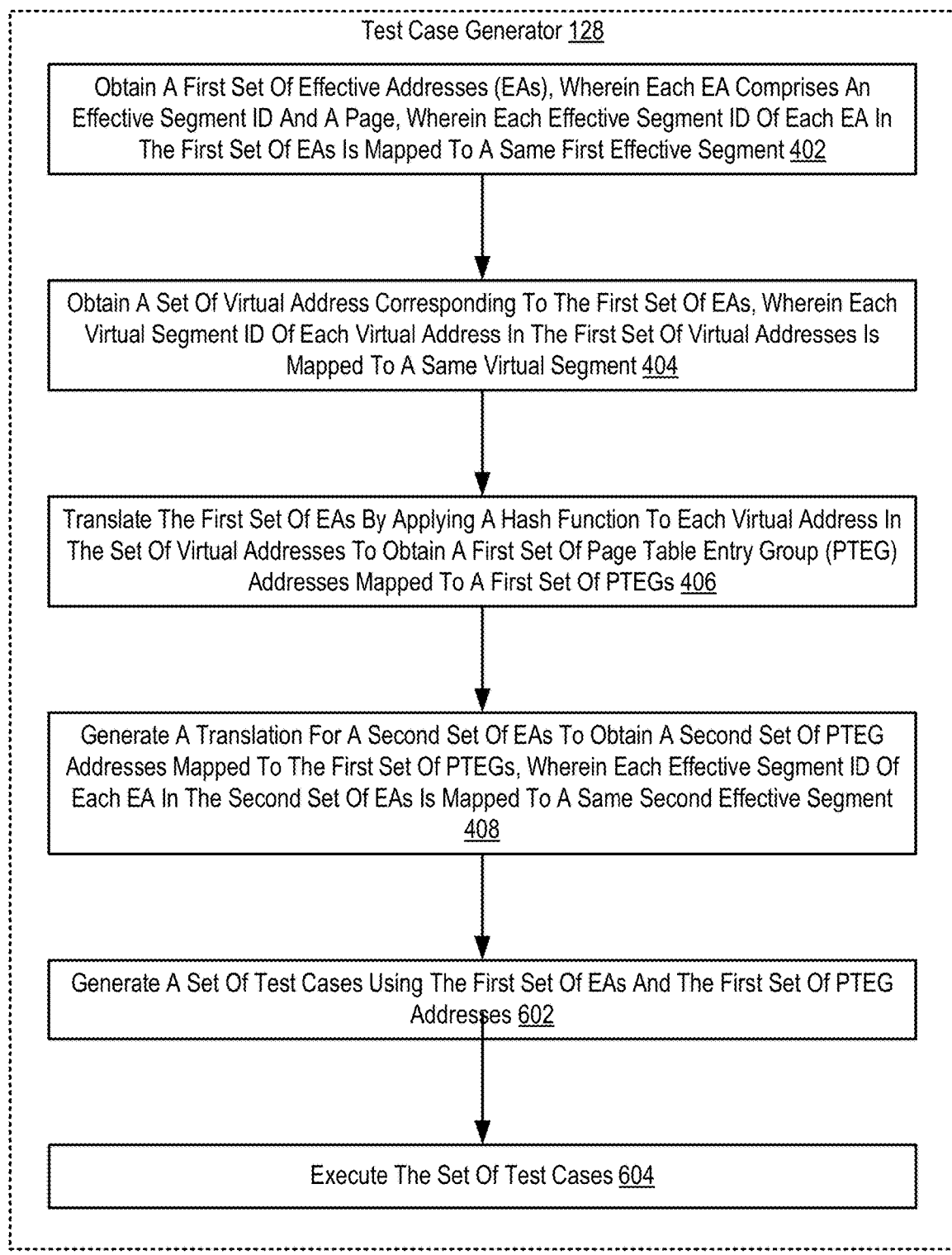
FIG. 6 sets forth a flow chart illustrating an exemplary method for efficiently generating effective address translations for memory management test cases according to embodiments of the present invention.

For further explanation, FIG. 6 sets forth a flow chart illustrating an exemplary method for efficiently generating effective address translations for memory management test cases according to embodiments of the present invention that includes obtaining (402) a first set of effective addresses (EAs), wherein each EA comprises an effective segment ID and a page, wherein each effective segment ID of each EA in the first set of EAs is mapped to a same first effective segment; obtaining (404) a set of virtual address corresponding to the first set of EAs, wherein each virtual segment ID of each virtual address in the first set of virtual addresses is mapped to a same virtual segment; translating (406) the first set of EAs by applying a hash function to each virtual address in the set of virtual addresses to obtain a first set of page table entry group (PTEG) addresses mapped to a first set of PTEGs; and generating (408) a translation for a second set of EAs to obtain a second set of PTEG addresses mapped to the first set of PTEGs, wherein each effective segment ID of each EA in the second set of EAs is mapped to a same second effective segment.

The method of FIG. 6 differs from the method of FIG. 4, however, in that the method of FIG. 6 further includes generating (602) a set of test cases using the first set of EAs and the first set of PTEG addresses; and executing (604) the set of test cases. Generating (602) a set of test cases using the first set of EAs and the first set of PTEG addresses may include populating instructions within a test case with the generated EAs and PTEG addresses. As discussed above, a test case may refer to a set of variables or conditions under which a tester determines whether a system under the test satisfies requirements or works correctly. Test cases may include such information as preconditions, a set of input values, a set of expected results, how to execute and check results, and/or expected post conditions, or any other suitable information. Test cases may also include an EA or a set of EAs and the associated translations into PTEG addresses.

Test cases may test various aspects of the memory management of a computing system. For example, a test case (or group of test cases) may be used to determine the stability and reliability of memory tables, such as a translation lookaside buffer. Test cases may also simulate conditions (such as a context switch) to determine the reliability of the elements involved. Each test case may involve one, hundreds, thousands, or millions of addresses. Executing (604) the set of test cases may include executing the set of instructions using the generated translations. Executing the test case may also include receiving metrics during the execution of the test case and evaluating the metrics to determine the success or failure of the system under test.

In view of the explanations set forth above, readers will recognize that the benefits of efficiently generating effective address translations for memory management test cases according to embodiments of the present invention include:
  Improving the operation of a computer system by efficiently generating test cases to test the memory subsystems of the computing system;
  Improving the operation of a computer system by generating a large number of address translations without applying a hashing function for each translation;
  Improving the operation of a computer system by reducing code complexity and size of code necessary for generating translations, which would otherwise require complex, lengthy software;
  Improving the operation of a computer system by reducing the time and complexity necessary for modifying existing translations;
  Improving the operation of a computer system by reducing the time and complexity necessary for modifying specific entries in the page table; and
  Improving the operation of a computer system by reducing the time and complexity necessary for generating a page table that utilizes virtual address aliasing.

Exemplary embodiments of the present invention are described largely in the context of a fully functional computer system for efficiently generating effective address translations for memory management test cases. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for efficiently generating effective address translations for memory management test cases, the method comprising:
    obtaining a first set of effective addresses (EAs), wherein each EA comprises an effective segment identifier ('ID') and a page, wherein each effective segment ID of each EA in the first set of EAs is mapped to a same first effective segment;
    obtaining a set of virtual address corresponding to the first set of EAs, wherein each virtual segment ID of each virtual address in the first set of virtual addresses is mapped to a same virtual segment;
    translating the first set of EAs by applying a hash function to each virtual address in the set of virtual addresses to obtain a first set of page table entry group (PTEG) addresses mapped to a first set of PTEGs; and
    generating a translation for a second set of EAs to obtain a second set of PTEG addresses mapped to the first set of PTEGs, wherein each effective segment ID of each EA in the second set of EAs is mapped to a same second effective segment.

2. The method of claim 1, further comprising:
    generating a translation for a third set of EAs to obtain a third set of PTEG addresses mapped to a second set of PTEGs, wherein translating the third set of EAs comprises altering a portion of each PTEG address in the first set of PTEG addresses to obtain the third set of PTEG addresses.

3. The method of claim 1, further comprising:
    generating a set of test cases using the first set of EAs and the first set of PTEG addresses; and
    executing the set of test cases.

4. The method of claim 1, wherein the translation of the second set of effective addresses is generated algorithmically without applying the hash function.

5. The method of claim 1, wherein each of the first set of EAs is mapped to a first page table entry (PTE) in each of the first set of PTEGs, and wherein each of the second set of EAs is mapped to a second PTE in each of the first set of PTEGs.

6. The method of claim 1, wherein the first set of PTEGs is a consecutive set of PTEGs in a page table.

7. The method of claim 1, wherein each PTE in a PTEG in the first set of PTEGs comprises a same real page.

8. An apparatus for efficiently generating effective address translations for memory management test cases, the apparatus comprising a computer processor, a computer memory operatively coupled to the computer processor, the computer memory having disposed within it computer program instructions that, when executed by the computer processor, cause the apparatus to carry out:
    obtaining a first set of effective addresses (EAs), wherein each EA comprises an effective segment identifier ('ID') and a page, wherein each effective segment ID of each EA in the first set of EAs is mapped to a same first effective segment;
    obtaining a set of virtual address corresponding to the first set of EAs, wherein each virtual segment ID of each virtual address in the first set of virtual addresses is mapped to a same virtual segment;
    translating the first set of EAs by applying a hash function to each virtual address in the set of virtual addresses to obtain a first set of page table entry group (PTEG) addresses mapped to a first set of PTEGs; and
    generating a translation for a second set of EAs to obtain a second set of PTEG addresses mapped to the first set of PTEGs, wherein each effective segment ID of each EA in the second set of EAs is mapped to a same second effective segment.

9. The apparatus of claim 8, the computer program instructions causing the apparatus to carry out:
generating a translation for a third set of EAs to obtain a third set of PTEG addresses mapped to a second set of PTEGs, wherein translating the third set of EAs comprises altering a portion of each PTEG address in the first set of PTEG addresses to obtain the third set of PTEG addresses.

10. The apparatus of claim 8, the computer program instructions causing the apparatus to carry out:
generating a set of test cases using the first set of EAs and the first set of PTEG addresses; and
executing the set of test cases.

11. The apparatus of claim 8, wherein the translation of the second set of effective addresses is generated algorithmically without applying the hash function.

12. The apparatus of claim 8, wherein each of the first set of EAs is mapped to a first page table entry (PTE) in each of the first set of PTEGs, and wherein each of the second set of EAs is mapped to a second PTE in each of the first set of PTEGs.

13. The apparatus of claim 8, wherein the first set of PTEGs is a consecutive set of PTEGs in a page table.

14. The apparatus of claim 8, wherein each PTE in a PTEG in the first set of PTEGs comprises a same real page.

15. A computer program product for efficiently generating effective address translations for memory management test cases, the computer program product disposed upon a computer readable storage medium, the computer program product comprising computer program instructions that, when executed, cause a computer to carry out:
obtaining a first set of effective addresses (EAs), wherein each EA comprises an effective segment identifier (ID) and a page, wherein each effective segment ID of each EA in the first set of EAs is mapped to a same first effective segment;
obtaining a set of virtual address corresponding to the first set of EAs, wherein each virtual segment ID of each virtual address in the first set of virtual addresses is mapped to a same virtual segment;
translating the first set of EAs by applying a hash function to each virtual address in the set of virtual addresses to obtain a first set of page table entry group (PTEG) addresses mapped to a first set of PTEGs; and
generating a translation for a second set of EAs to obtain a second set of PTEG addresses mapped to the first set of PTEGs, wherein each effective segment ID of each EA in the second set of EAs is mapped to a same second effective segment.

16. The computer program product of claim 15, the computer program instructions causing the computer to carry out:
generating a translation for a third set of EAs to obtain a third set of PTEG addresses mapped to a second set of PTEGs, wherein translating the third set of EAs comprises altering a portion of each PTEG address in the first set of PTEG addresses to obtain the third set of PTEG addresses.

17. The computer program product of claim 15, the computer program instructions causing the computer to carry out:
generating a set of test cases using the first set of EAs and the first set of PTEG addresses; and
executing the set of test cases.

18. The computer program product of claim 15, wherein the translation of the second set of effective addresses is generated algorithmically without applying the hash function.

19. The computer program product of claim 15, wherein each of the first set of EAs is mapped to a first page table entry (PTE) in each of the first set of PTEGs, and wherein each of the second set of EAs is mapped to a second PTE in each of the first set of PTEGs.

20. The computer program product of claim 15, wherein the first set of PTEGs is a consecutive set of PTEGs in a page table.

* * * * *